US00RE44000E

(19) United States
(12) Reissued Patent
Mezzalira et al.

(10) Patent Number: US RE44,000 E
(45) Date of Reissued Patent: Feb. 19, 2013

(54) CHAIN MESH NETWORK HOSE

(75) Inventors: Rinaldo Mezzalira, Arcignano di Sandrigo (IT); Alessandro Mezzalira, legal representative, Arcignano di Sandrigo (IT); Valentino Vigolo, Caldogno (IT)

(73) Assignee: FITT S.p.A., Sandrigo (VI) (IT)

(21) Appl. No.: 13/295,082

(22) Filed: Nov. 13, 2011

Related U.S. Patent Documents

Reissue of:
(64) Patent No.: 5,477,888
Issued: Dec. 26, 1995
Appl. No.: 08/243,483
Filed: May 13, 1994

(30) Foreign Application Priority Data

May 13, 1994 (IT) ..... VI93A0078

(51) Int. Cl.
*F16L 11/08* (2006.01)
(52) U.S. Cl. ..... 138/125; 138/126
(58) Field of Classification Search ..... 138/124–126, 138/177, 172
See application file for complete search history.

(56) References Cited

U.S. PATENT DOCUMENTS

| | | | | | |
|---|---|---|---|---|---|
| 325,618 | A | * | 9/1885 | Cook | 186/10 |
| 3,253,618 | A | | 5/1966 | Cook | 138/125 |
| 3,682,202 | A | * | 8/1972 | Buhrmann et al. | 138/126 |
| 4,091,063 | A | * | 5/1978 | Logan | 264/506 |
| 4,308,896 | A | * | 1/1982 | Davis | 138/126 |
| 4,553,568 | A | * | 11/1985 | Piccoli et al. | 138/125 |
| 4,662,405 | A | * | 5/1987 | Besche et al. | 138/125 |
| 4,679,599 | A | * | 7/1987 | Newberry et al. | 138/104 |
| 4,989,643 | A | * | 2/1991 | Walton et al. | 138/126 |
| 5,264,262 | A | * | 11/1993 | Igarashi | 428/36.9 |

FOREIGN PATENT DOCUMENTS

| | | | |
|---|---|---|---|
| EP | 0153544 | | 2/1984 |
| EP | 153544 | A1 * | 9/1985 |
| FR | 2254746 | | 12/1974 |
| FR | 2254746 | A * | 8/1975 |
| FR | 2290292 | | 11/1975 |
| FR | 2290292 | A * | 7/1976 |
| GB | 863303 | | 12/1959 |

* cited by examiner

*Primary Examiner* — Patrick F Brinson
(74) *Attorney, Agent, or Firm* — Themis Law

(57) ABSTRACT

The invention discloses a hose (10) which comprises at least one tubular layer (3) of plastic or rubber material, a mesh-network (4) of the chain type presenting mesh lines (5) and mesh rows (6) having a tubular shape being wound on the external surface of said inner layer, a possible external layer (7), and is characterized in that said mesh rows are slanted in relation to the longitudinal axis of the hose. According to a preferred embodiment the lines (5) of said meshes are slanted in relation to the longitudinal axis Y of the hose, following a direction opposite to the direction of the mesh rows (6).

3 Claims, 1 Drawing Sheet

FIG. 1.
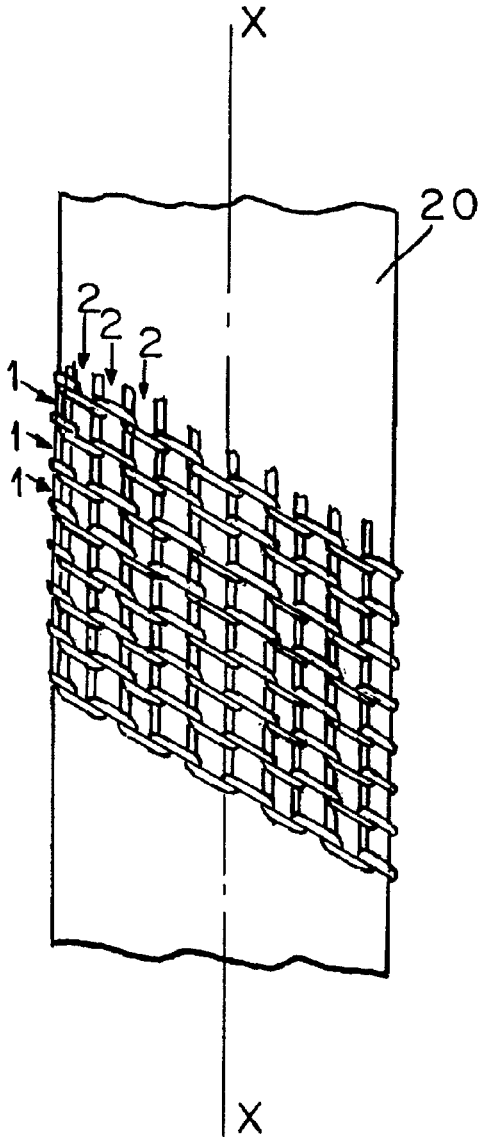
FIG. 2.
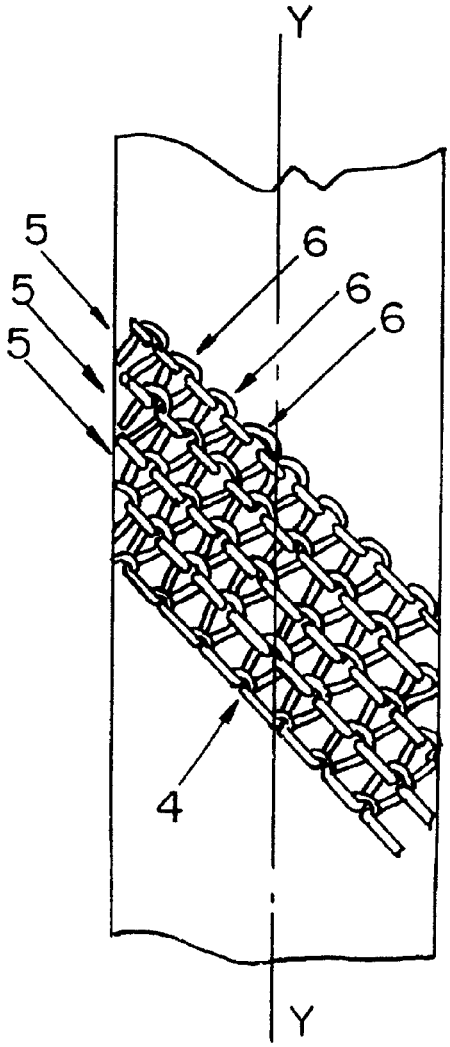
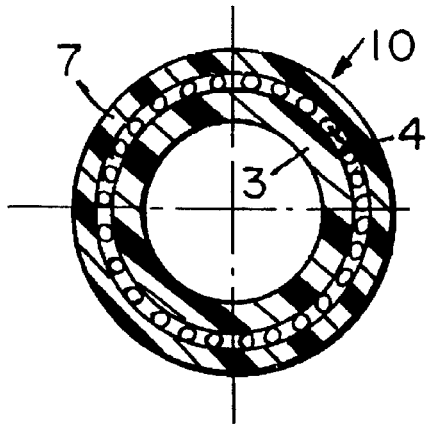
FIG. 3.

CHAIN MESH NETWORK HOSE

Matter enclosed in heavy brackets [ ] appears in the original patent but forms no part of this reissue specification; matter printed in italics indicates the additions made by reissue.

DESCRIPTION

The invention concerns a hose made of plastic or rubber material and reinforced with a mesh stocking for bearing fluids under pressure in the hydraulic sector or even in field of the distribution of fluids under pressure in open or closed circuits.

It is a known fact that the hoses mostly made of plastic material and suitable to bear fluids under pressure, present a first internal tubular layer made of plastic material or rubber, which is lined with a tubular fabric having the purpose of increasing the pressure resistance of the hose, of reducing its deformation and of increasing its performances.

One of the most used types of hose suited for the purpose, is the so-called "latticed" hose, in which the tubular layer of plastic material is reinforced with a series of threads wound in a spiral over the hose, said threads being arranged parallel, equally spaced and overlaying as many other transversal threads arranged at a symmetrical angular position in relation to an axis parallel to the hose axis, so as to form a regular rhombus lattice. This latticed fabric, wound on the external surface of said inner hose layer, is then attached through another external layer generally, but not necessarily, transparent which secures the latticed fabric to the hose itself. With this type of stocking the hose is suitable to bear a higher pressure than a hose without stocking, without any substantial deformations occurring, since the weaving does not yield and therefore prevents the inner layer of the hose from deforming.

A limit of the just described latticed hose consists in that its flexibility is relatively low, i.e. the bending radiuses under which the hose can be subjected, are rather wide in relation to the meshed hoses.

Another type of just as well-known flexible hose is the hose in which the stocking wound over the external part of the hose is made in the shape of a network. It is a known fact that the network is a special kind of weaving obtained with one or more threads which are linked together with more or less winding loops, also called "bushes" or "elementary meshes", which give to said mesh-network fabric a characteristic of high elasticity.

The so-called "chain" mesh-network, consists of a series of threads parallel to one another and fed by many reels, which are bent so as to obtain as many rows of meshes having a tie both following the weft direction and the chain direction, their interlacing creating a transversal series of mesh lines and a longitudinal series of mesh rows, or ribs.

One of the most used hoses in the market, is the hose wherein the network is of the tricot chain type. It will be understood that in the technical jargon of the field the tricot mesh-network is the type of mesh-network wherein each thread forms the mesh by interlacing with one or more threads on its right and with one or more threads on its left.

If, on one hand, the tricot mesh-network hose presents a higher flexibility, since, as is known, the mesh becomes more flexible when the hose diameter increases because of the increased pressure, on the other hand, the limit of the mesh fabric and in particular of the hose with the tricot mesh, is that with the pressure increase, the hose is subjected to a torsional effect caused by the fluid flowing under pressure within the same. This is due to the spiral run of the mesh lines which, as opposed to the essentially longitudinal run of the rows, cause an out-of-balance reaction and in particular a torque of the hose.

The main proposed purpose of the invention is to eliminate the above mentioned inconveniences.

In particular the torque effect which occurs in the mesh-network fabric is to be eliminated, without having to sacrifice the advantages offered by the mesh-network as regards the flexibility and the pressure explosion.

All the above mentioned purposes and others which will be better pointed out hereinafter, are obtained with the hose according to the invention which, in accordance with the content of the first claim, comprises, from the interior to the exterior:

- at least one inner tubular layer of plastic or rubber material;
- a chain-type mesh-network presenting mesh lines and mesh rows, having a tubular shape and wound on the external surface of said inner layer;
- a possible external layer for the protection of said mesh-network, characaterized in that said mesh rows are slanted in relation to the longitudinal axis of the hose.

Further characteristics and scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein:

- FIG. 1 shows a front view of a hose coated with a chain mesh-network according to the known technique;
- FIG. 2 shows the hose according to the invention;
- FIG. 3 is a cross-section of the hose of FIG. 2.

With reference to the mentioned Figures, it can be observed that the hose mesh-network of FIG. 1, showing a hose with a mesh-network manufactured according to the known technique, is formed by chain meshes of the tricot type. Said meshes form some lines, indicated with 1, parallel to one another, and some longitudinal rows, indicated with 2, which are essentially parallel to the X axis of the hose.

This type of mesh weaving is directly realized on the hose 20 by so-called mesh-weaving machines, which are present on the market, their performance in mesh forming being well known.

FIG. 2 shows the hose according to the invention, wherein, on the inner layer 3 of the hose 10 the chain mesh-network, indicated as a whole with 4, is woven, it being formed by lines 5, parallel to one another, slanted in relation to the Y axis of the hose 10 of FIG. 2, and by rows 6 also being slanted in relation to an axis parallel to the Y axis, but following a direction opposite to that of the lines 5.

With this crossed arrangement, and transversal in relation to the Y axis of the hose, the torque which occurred and concerned the hose, when the latter was wound on a normal chain-type mesh-network with essentially longitudinal rows, is eliminated.

In fact, in the specific case of FIG. 2, wherein the rows are arranged following a transversal direction rather than a longitudinal one, the rotational force component is compensated, which occurred, because of the spiral winding of the lines 5.

With such a type of network, the forces resulting from the mesh rows and from the mesh lines, compensate each other until they eliminate each other, thus making the hose 10 insensitive to the so-called spiral movement effect, when said hose is subjected to a tension because of the fluid flowing under pressure.

An external layer 7, made of plastic or rubber, secures the thus obtained chain mesh-network on the hose surface, as is the case, in all the hoses manufactured according to the known technique.

One type of machine weaving the chain mesh-network type with the mesh rows arrangement being slanted in relation to the longitudinal axis, is described in the Italian patent application for invention in the name of the same applicant.

It is important to underline that the slant of the mesh rows can be modified according to selected angles, also in relation to the hose material, its diameter, the type of network, the number of reels, the pitch of the lines and rows, as well as of the type and/or the thread title.

Moreover, it will be pointed out, that the tricot-type mesh-network, shown in the drawing of FIG. 2, can also be a chain-type mesh-network differring from the tricot type, it being understood that all the hoses reinforced with chain types mesh-network presenting mesh rows slanted in relation to the longitudinal axis of the hose, independently from the special type of chain mesh-network which is to be realized still remain within the spirit and the scope of the invention.

Therefore, the same results can be obtained with chain mesh-networks of the plain tricot type, double tricot or plain atlas, double atlas, koper and chain, as well as other chain mesh-network types.

We claim:

1. A hose, from the interior to the exterior, comprising:

at least one tubular inner layer of plastic or rubber material having an exterior surface;

a chain-type mesh-network having mesh lines and mesh rows, said chain-type mesh-network having in a single layer a tubular shape and being wound one the exterior surface of said inner layer, wherein said mesh rows and mesh lines being slanted in directions, substantially perpendicular to each other such that the angle of inclination of the mesh rows relative to the longitudinal axis of the hose is substantially equal to the angle of inclination of the mesh lines relative to the longitudinal axis of the hose for eliminating torsion effects resulting from pressure changes within the hose; and an external layer disposed over the chain-type mesh-network for the protection thereof.

2. A hose according to claim 1 wherein said chain-type mesh-network has parallel lines of said mesh lines and mesh rows slanted in relation to the longitudinal axis of the hose.

3. A hose according to claim 1 wherein the mesh lines and mesh rows are formed of threads of substantially the same material.

* * * * *